April 1, 1969     D. M. HATCH ET AL     3,436,292
METHOD FOR FABRICATING ABLATIVE STRUCTURES
Filed April 30, 1964

INVENTORS
DONALD M. HATCH
WALTER W. WOOD

INVENTORS
DONALD M. HATCH
WALTER W. WOOD

ATTORNEYS

April 1, 1969     D. M. HATCH ET AL     3,436,292
METHOD FOR FABRICATING ABLATIVE STRUCTURES
Filed April 30, 1964                                  Sheet 4 of 5

INVENTORS
DONALD M. HATCH
WALTER W. WOOD
BY
Fraser & Boguski
ATTORNEYS

3,436,292
METHOD FOR FABRICATING ABLATIVE STRUCTURES
Donald Monroe Hatch, Harbor City, and Walter W. Wood, Inglewood, Calif., assignors to Hitco, a corporation of California
Filed Apr. 30, 1964, Ser. No. 363,738
Int. Cl. B29c 1/14
U.S. Cl. 156—222     9 Claims

ABSTRACT OF THE DISCLOSURE

Ablative structures are prepared by laying up panels of at least two dissimilar high-temperature resistant materials impregnated with a thermally curable resin so that the panels are at least partially interleaved and curing the resin and densifying the structure under increased temperature and pressure conditions.

---

This invention generally relates to ablative structures, and methods for fabricating such structures, and more particularly relates to improved heat resistant and ablation resistant structures exhibiting superior strength, uniformity and physical integrity under extreme environmental conditions.

Modern space technology requires that structural components be capable of withstanding ever increasing extremes of temperature and friction. In rocketry and atmospheric reentry applications, for example, the high temperature, high velocity gases which are generated would substantially immediately destroy conventional types of insulative materials. Materials which can withstand such temperatures are not good insulators. For example, metallic compounds, such as refractory oxides and carbides, have high melting points and sometimes high physical strength but at the same time are excellent conductors of heat. The best insulators, on the other hand, do not have adequate strength or high temperature resistance, and cannot resist rapid erosion when used as exposed surfaces.

To solve such problems, structures have been developed which utilize controlled erosion of selected materials disposed in arrangements which provide adequate strength, as well as sufficient heat insulation. Ablative structures usually comprise fibers having high temperature properties disposed in a synthetic resin binder. As the fibers of the structure erode at the exposed surface, they maintain their physical integrity and stay relatively cool at interior portions. The erosion rate is additionally limited because the fibers may have specific thermal conversion properties. Relatively pure silica fibers, for example, have a high heat of fusion, and consume much thermal and kinetic energy in converting from a solid to a highly viscous molten state before finally eroding. Carbon fibers, on the other hand, transform into graphite under high temperature conditions, and maintain their physical integrity until the sublimation temperature for graphite is reached. These and other ablative materials are therefore used in structures which are characterized by their resistance to destruction and by their insulative characteristics under high temperature, high gas velocity conditions.

Attempts are constantly being made to optimize the characteristics of ablative structures. It is now known that, in addition to the type of fiber which is used the orientation of the fibers at the exposed surface can materially affect the life and performance of the structure. The strength and other physical properties of the structure are also functions of the disposition of the fiber structure and of the density of the resin system within the fabricated body.

In recognition of these considerations, most high performance ablative structures have heretofore utilized configurations which may be referred to as "tape wound" systems. The individual fibers are woven into a fabric and a tape of this fabric of suitable width is then wound about a mandrel or other male die to form the desired body, such as a cylindrical rocket nozzle. It may be seen that the longitudinal and the circumferential strength of structures of this kind can vary widely, depending upon the angle and width of the plies of fabric relative to the longitudinal axis of the structure. On the other hand, the angle at which the fabric lies relative to the exposed surface also determines the orientation of the fibers, and imposes a further limiting condition on the design of the structure.

Although such structures are much used, and are advantageous for many applications, they present a number of problems which are not at first apparent. In order to build up large structures, a rather heavy resin impregnation must be used and the resin must sometimes be heated, in order to assure adherence of successive turns during the winding. Thus the speed of the winding must be regulated in accordance with the amount of pressure which can be exerted and the tackiness of the resin material.

The presence of high proportions of resin in tape wound structures means that there is a high percentage of excess volatiles which must be removed during the molding operation. During densification, it is extremely difficult to reduce bulk and eliminate volatiles without introducing wrinkles in the plies of material, as they are compressed inwardly on the mandrel. Consequently, although with some tape orientations the theoretical hoop strength is very high, the actual strength may be very low. Moreover, the longitudinal strength of the structure is largely determined by the interlaminar shear area between adjacent plies in the longitudinal direction. When the plies are normal to the exposed surface for best fiber orientation, the longitudinal strength is relatively low.

It is therefore desirable to be able to attain strength and ablation characteristics which approach the optimum for each individual factor. However, assembly and fabrication costs must also be considered, including rejection factors and failure rates for a given construction technique.

It is also desirable to be able to achieve other structural configurations which have not heretofore been feasible. Obviously, for a given application the best combination of performance, weight and cost may be a composite structure which combines the properties of several materials to best advantage. A typical example is the combination of a primary outer structure using high strength materials with an ablative inner structure using high temperature materials. In order to fabricate a composite structure of this kind using tape winding techniques, it has been necessary to fabricate each segment separately, machine each segment to its desired final size, and then assemble the final composite system, using whatever joinder techniques are feasible under the circumstances. Obviously, it would be far preferable to utilize a single fabricating process and to achieve, if possible, a chemical and mechanical bond between the different parts of a structure. It is also highly desirable to be able to vary the thickness of the various parts of the structure, without machining off large volumes of valuable material. The assembly operation should, if further possible, be carried out with relatively unskilled personnel, and with low failure and reject rates.

These considerations should, of course, be combined with the desirable features of strength and fiber orientation previously discussed.

Accordingly, it is an object of the present invention to provide improved ablative structures.

It is also an object of the invention to provide improved methods for fabricating ablative structures.

A further object of the invention is to provide an improved method of fabricating ablative structures having a plurality of differnt components but exhibiting improved structural characteristics.

Another object of the invention is to provide an improved method of fabricating unitary ablative structures of controlled size, shape and structural configuration.

Yet another object of the invention is to provide a unitary ablative structure incorporating a plurality of different materials disposed in a controlled manner in the structure so as to optimize the characteristics of the structure.

These and other objects of the invention are accomplished, in accordance with the invention, by forming ablative structures from separate wall segments which are chemically and mechanically united in a joinder region between them. Specifically, successive plies of an individual segment may be formed of separate panels overlapped along the circumferntial direction of a surface of revolution. The plies may be relatively long in both the circumferntial and longitudinal directions, so that high hoop strength is provided by virtue of a high interlaminar shear area between adjacent plies, while maximum longitudinal strength is also achieved. The plies of the different wall segments are laid up at like angles relative to the surface of revolution, and are interleaved and joined in a transition zone between adjacent wall segments, so that a unified structure is provided. These transition regions may be circumferential, or longitudinal, or both, and wall segments may be formed from panels of selected different materials. The complete structure may be assembled rapidly by relatively unskilled personnel, and thereafter, densified and machined as a single unit which is consistently free from imperfections.

As a specific example, a flared rocket nozzle having a small diameter throat section is fabricated of several different layers of materials of varying thickness to provide an optimum combination of properties for the nozzle. Thus, the structure is in the form of a surface of revolution having solid walls of varying radial thicknesses, the outer wall segment, or primary structure, being formed of panels of a selected high strength material. The panels of the outer wall segment each have one edge extending longitudinally along the entire outer surface of the body. The geometries and circumferential layup angles of the panels relative to the surface of revolution provide variation of the wall thickness along the body. Two additional wall segments, interior to the primary structure, are also employed. In the forward section of the nozzle, a graphite material is employed, the graphite wall segment being formed of appropriately configured and circumferentially overlapped panels. The third wall segment, which is aft of the second wall segment and within the primary structure, is made up of panels of a different ablative material, such as silica fiber fabric. The plies of both interior wall segments have like circumferential layup angles relative to the surface of revolution and have substantially parallel inner edges. At the region between the two wall segments the plies are interleaved in a consistent fashion about the entire circumference of the structure.

A feature of the invention is the use of layup angles and panel configurations such that in the transition regions between wall segments the edges of facing panels are substantially equal in length and parallel in direction. Another feature is the selection of panel geometries such that the outer edge of a panel lies along a substantially longitudinal line on the surface of revolution, and the inner surface similarly lies along a substantially longitudinal line on the surface of the revolution. Further, in the region of joinder between associated wall segments, the parallel and substantially equal length edges of facing panels are interleaved in such a maner as to avoid the introduction of sharp angles into the materials, or disruption of the body wall, while a transition zone is formed in which a firm mechanical and chemical bond exists.

In structures formed in accordance with the invention, the various ablative and physical characteristics which are most desired are achieved in combination. When a fabric material is used for the panels, for example, the edges of the panels are exposed to the ablative condtions, so that there is best use of the characteristics of the individual monofilaments and no tendency to delaminate. Further, the conductive heat path along a ply is extremely long because of the layup angle, even though the radial thickness of the body may be small. In addition, the longitudinal disposition of the panels insures that the longitudinal strength of the composite structure will be a maximum. At the same time, the layup angle also provides an extremely high interlaminar shear area between adjacent panels, and insures best hoop strength.

Methods in accordance with the invention permit complex composite structures to be formed rapidly, with relatively unskilled labor and with a minimum of operative steps. The successive wall segments may each be laid up in succession without physical adhesion between them. As each wall segment is laid up, the panels may be temporarily affixed by the use of any appropriate fastening means, such as adhesives or staples. The entire structure is formed within a female mold, and a single low expansion phenolic resin impregnation system may be used for the panels of the various wall segments. Individual or groups of plies of one wall segment may be interleaved with those of another, to provide a joinder region extending around the entire structure. The complete assembly may thereupon be densified and cured in a single step, with the pressure being exerted in a radially outward direction toward the female mold. The resin structure may be kept to a minimum, so that there is a minimum of volatiles to be eliminated during densification. Further, the individual panels of the construction are free for sliding movement relative to each other during densification. The net result is a uniform, wrinkle-free, composite structure formed in a single step.

A great variety of improved unitary ablative structures can be fabricated by the present method, each structure being tailored to have specific thicknesses and combinations of wall segments, so as to provide optimum combinations of properties to withstand expected conditions. Sturctures provided in accordance with the invention have lower char rates and better erosion resistance. Moreover, thinner and therefore lighter components can be used to accomplish a given result.

A better understanding of the invention may be had by reference to the following description, taken in conjunction with the accompanying drawings, in which.

The composite ablative structure illustrated in FIGS. 1-5 provides a useful specific example of systems in accordance with the invention. The structure shown in FIGS. 1-5 is a flared rocket nozzle 10 in the form of a surface of revolution having solid walls of a complex interior configuration. The outer and inner surfaces of the structure are substantially linear in the direction parallel to the central longitudinal axis, but the structure is made up of different wall segments which provide selected radial variations in the thicknesses and kinds of materials.

The ablative structure 10 shown is intended for uses in which the eroding gases are passed along the interior aperture of the structure, from the narrow or forward end to the wider or trailing end. The structure is shown as it may be mounted in an outer shell 11, which may also comprise a female mold during the layup operation. The physical and ablative properties of the structure are principally derived from an outer wall segment 14, a first inner wall segment 15 and a second inner wall segment 16, the first inner wall segment lying in the forward interior portion of the structure 10, and the second inner wall segment 16 lying in the trailing rearward portion of the structure 10. Each of the wall segments 14–16 comprises a fiber reinforced resin impregnated solid body, but the joinder regions between the bodies are selectively formed into transition zones.

Figures 1, 2, 3:
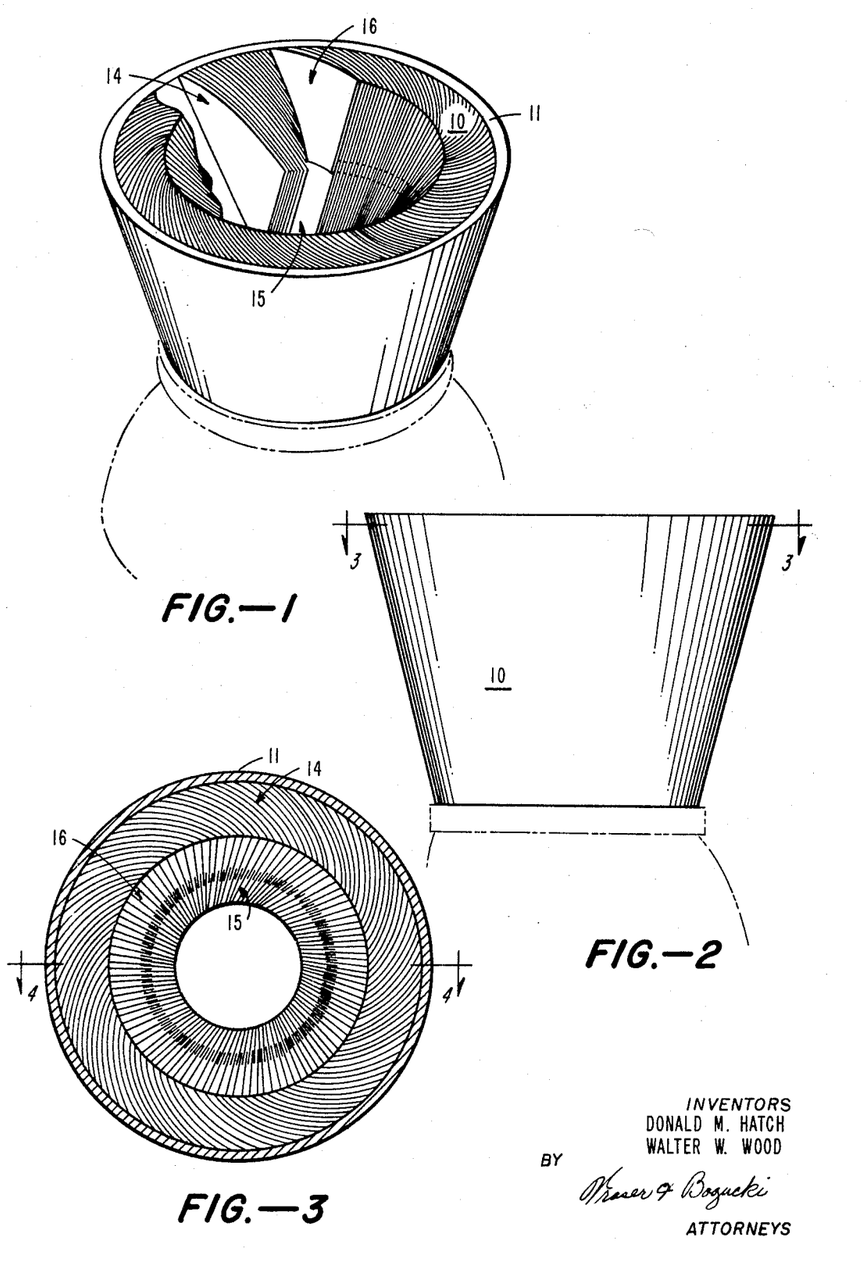
FIG. 1 is a perspective view, partially broken away, of an exemplary form of ablative structure, specifically a composite rocket nozzle in accordance with the present invention.
FIG. 2 is a side elevation of the arrangement of FIG. 1.
FIG. 3 is a plan sectional view of the arrangement of FIG. 1, taken along the lines 3—3 of FIG. 2.
Figure 4:
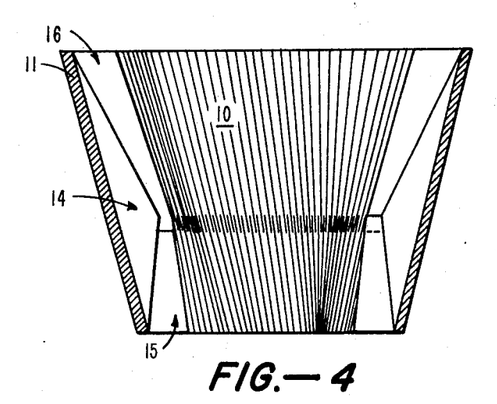
FIG. 4 is a side sectional view of the arrangement of FIG. 1, taken along the lines 4—4 of FIG. 3.
Figure 5:
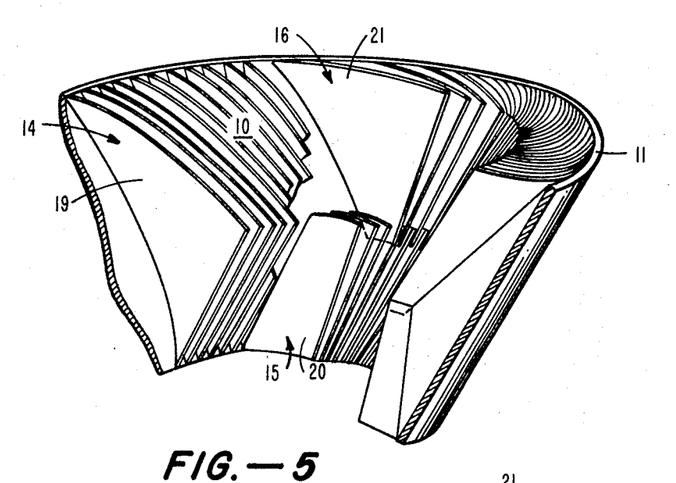
FIG. 5 is an idealized fragmentary perspective view of a part of the arrangement of FIG. 1, with portions broken away to illustrate the manner in which adjacent wall segments may be united in a transition zone.

Each wall segment is formed of a plurality of panels laid up in circumferentially overlapping relation in the direction about the structure 10. The geometries and layup angles of the individual panels are selected such as to provide radial thickness variations along the length of the wall segment, as well as selected circumferential and radial attitudes of the panels and the fibers within the panels themselves. The outer wall segment 14, for example, is made up of triangular first panels 19 of glass fiber fabric. Each of these first panels 19 (seen also in FIG. 6) has a long edge disposed along the outer surface of the wall segment 14, and extending along the entire length of the structure 10. Each of the first panels 19 lies along an arc length which forms a relatively low angle (which is alike for each of the panels 19) relative to the circumference of the structure 10. The two shorter sides of the panel 19 thus form the forward and trailing interior surfaces of the outer wall segment 14.

In the views shown in FIGS. 1–5, it is not feasible to illustrate each of the panels in detail and to show the parts to scale. As the panels 19 are circumferentially over-lapped, however, with a given incremental spacing such as one-quarter inch they follow approximate arcs rather than straight lines. After subsequent densification and curing they retain this curvature but the fibers are unified into the solid structure. For clarity, however, the representation of FIGS. 1–5 shows the panels within the solid structure.

This arrangement of the outer wall segment 14 provides a high strength primary structure having material advantages. Note that the individual plies of the outer wall segment 14 extend along the entire length of the structure 10, so that the longitudinal strength of the structure 10 is at a maxium. The circumferential or hoop strength of this structure is also extremely high. Because the arc length of each ply is relatively long in comparison to the radial thickness of the wall segment 14, there is a large area of overlap between adjacent plies or laminations. During curing, the resin in adjacent plies becomes unified so that a high interlaminar shear area is developed which is determinative of the hoop strength of the structure. Further, the radial thickness of the primary outer wall segment 14 may be varied, by changes in the geometry of the individual panels 19, so as to provide maximum hoop strength at a selected lentghwise region.

Figures 6, 7, 8:
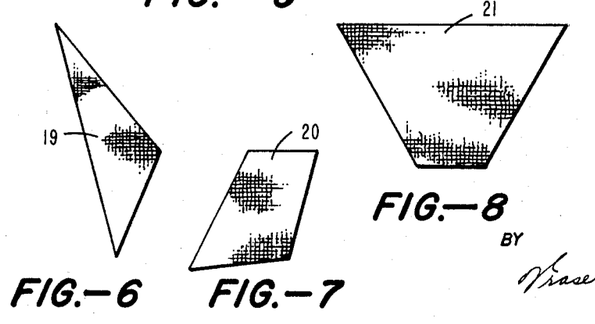
FIG. 6 is a plan view of a first panel utilized in the arrangement of FIG. 1.
FIG. 7 is a plan view of a second panel utilized in the arrangement of FIG. 1.
FIG. 8 is a plan view of the third panel used in the arrangement of FIG. 1.

The first and second inner wall segments 15 and 16 are likewise formed from circumferentially over-lapped panels 20 and 21 which are shown in detail in FIGS. 7 and 8 respectively. The trapezoidal second panels 20 in the first inner wall segment 15, for example, may consist of resin impregnated graphite fabric, while the trapezoidal third panels 21 in the second inner wall segment 16, for example, may consist of resin impregnated silica fiber fabric panels.

The geometrical configurations of these panels 20 and 21, and their layup angles, relative to the circumference ,of the structure 10, are selected such that a number of important benefits are derived. The configurations of panels 20 and 21 are selected such that, with like layup angles of the second and third panels 20 and 21, a linear internal surface is defined for the ablative structure 10. This surface primarily consists of the internal edges of the second and third panels 20 and 21, which are substantially parallel and which form relatively small angles to a line parallel to the center line of the structure 10. Further, the adjacent parts of the two inner wall segments 15 and 16 have edges on the panels 20 and 21 which are parallel, and substantially equal in length. In this joinder region, which may be referred to as a transition zone, the panels of the first inner wall segment 15 are interleaved with the panels of the second inner wall segment 16. The interleaving may be between individual plies from such segment, or between individual plies from one segment and various multiple numbers of plies from the other, or between multiple numbers of plies from the two segments. In the usual instance, individual plies from one segment will be interleaved with varying numbers of plies from the other to provide a uniform effect.

The resin systems for both the second and third panels 20 and 21 preferably are chosen to be alike, and so as to correspond to that used for the first panels 19, so that a uniform and matching resin system results from a single densification and curing. By virtue of the interleaving, a substantial interlaminar shear area is provided between adjacent panels in the transition zone, and a chemical and mechanical bond is formed which unifies the structure.

This unitary structure, with bonding where desired between adjacent wall segments, is found to have substantially superior properties to prior art structures. When subjected to acceleration and thrust forces, concurrently with the eroding effects of a high temperature, high velocity gas atmosphere, there is superior performance and a much greater insurance against failure, in comparison with prior art systems. As another example, test systems provided in accordance with the invention can be successfully subjected to concurrent centrifugal and ablative effects, never before satisfactorily met by the structures of the prior art.

It will now be appreciated that structures in accordance with the invention satisfactorily meet the conditions imposed by each of the four factors which define the performance of an ablative structure. The ablative fiber or filler material can be chosen with greater freedom, because the wall segments can be varied throughout the length of the structure or throughout the radial dimension of the structure (for a surface of revolution) so as to best meet the conditions which are encountered at various points in the structure. The orientations of the panels which make up the primary and ablative portions of the structure are such as to permit excellent combinations of longitudinal and hoop strengths. Finally, the orientations of the fibers themselves are of additional benefit to the ablative properties. Thus, only selected edges of the panels are presented to the eroding gases, and these edges are subtsantially parallel to the flow of the eroding gases, so that there is no tendency for segments of the structure to delaminate, or for large segments of the structure to tear away from the remainder. The large interlaminar contact areas, and the long arc length between the hot side and cold side of the structure preserve hoop strength while providing superior insulative properties without requiring excessive radial thickness.

A number of alternatives have not been shown in conjunction with the arrangement of FIGS. 1–5, but will present themselves to those skilled in the art. The individual transition zones, or numbers of transition zones, can be varied within a given composite structure. In the arrangement of FIGS. 1–5, for example, the panels of the two inner segments 15 and 16 may be interleaved with the panels of the outer segment 14, if the appropriate conditions are observed. These conditions are that the layup angles must be substantially similar, and that the interleaving must be accomplished without the introduction of a crimp or a sharp angular diversion in the length of a panel. Such abrupt discontinuity would appreciably decrease the strength of the structure.

Another alternative arrangement which might be used is to mechanically bond the outer structure, such as the primary structure of the outer wall segment 14, to the outer shell 11, as by internal rivets. This alternative is available at the option of the designer, and is of significance because it can readily be achieved as a part of the layup and subsequent densification and curing operation. It should also be noted that considerable freedom is permitted in the configuration of the composite structure, and in the fiber orientation at the exposed surface. Within a wall segment, panels of different configurations may be utilized, in a regular or a random pattern, so as to facilitate interleaving with adjacent wall segments, or so as to provide a wider or specially shaped transition region. Also, by cutting the panels so as to provide the exposed edges with a specific inclination relative to the weave of a fabric, the closest approximation to a completely end grain fiber orientation can be achieved.

Although the various panels or plies are discussed in terms of fabric materials, because these are widely used and relatively easy to handle, it will be recognized that various other forms of oriented and nonoriented fiber body constructions may also be employed.

Figure 9:
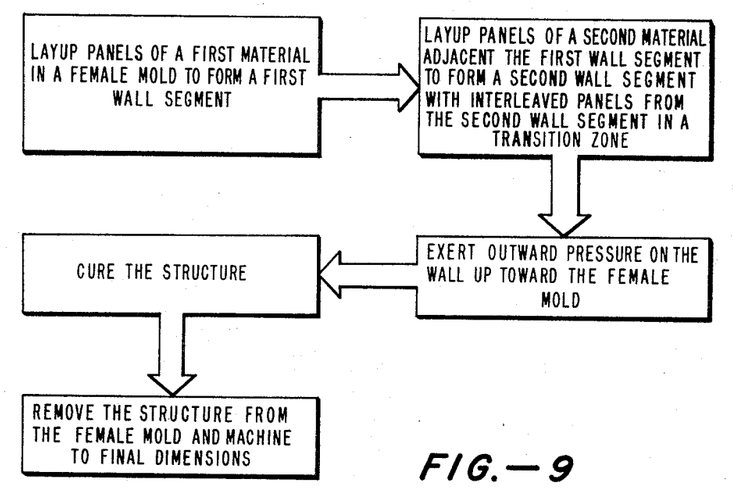
FIG. 9 is a block diagram of successive steps in an exemplification of methods for fabricating improved ablative structures in accordance with the invention.
Figure 10:
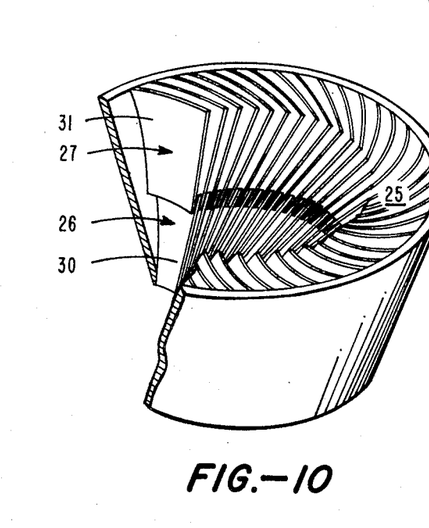
FIG. 10 is a perspective view, partially broken away, of a different form of ablative structure in accordance with the invention.
Figure 11:
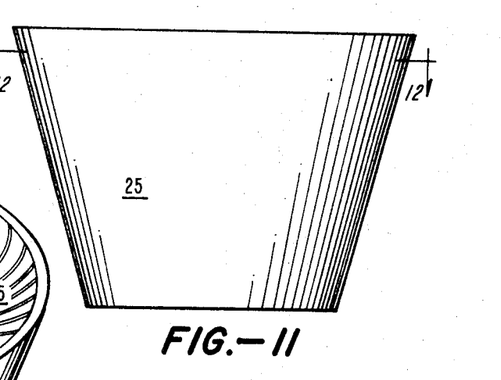
FIG. 11 is a side elevation of the arrangement of FIG. 10.
Figure 12:
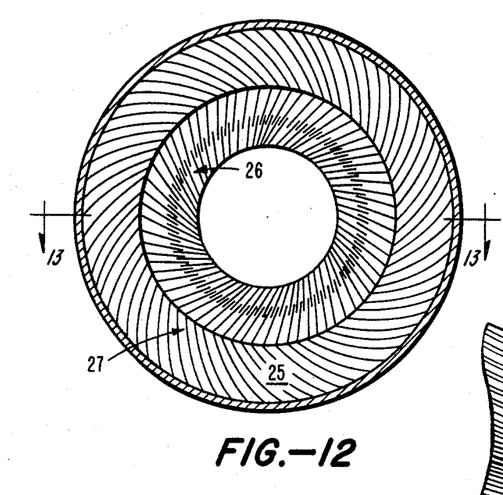
FIG. 12 is a plan sectional view of the arrangement of FIG. 10, taken along the lines 12—12 of FIG. 11.
Figure 13:
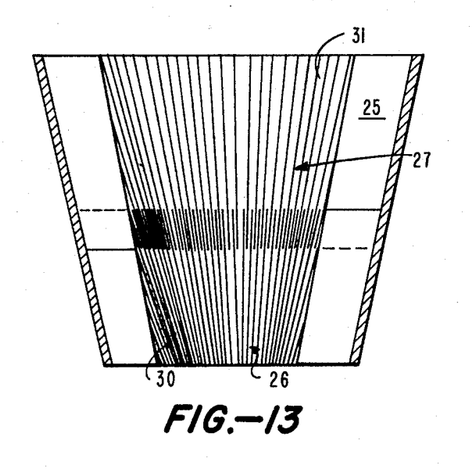
FIG. 13 is a side sectional view of the arrangement of FIG. 10, taken along the lines 13—13 of FIG. 12.

Methods in accordance with the invention may utilize the sequence of steps generally outlined in FIG. 9. The successive segments of a solid walled structure are built up in a female mold, which need not be a surface of revolution. Each wall segment is laid up of panels having selected geometrical configurations of a resin impregnated material. The resinous materials used for impregnation are preferably the same throughout all panels in the structure, although where this is not feasible a higher shrink material should be utilized at the inside, rather than at the outside of the structure. Only a relatively low proportion of resin is needed, inasmuch as adjacent plies need not be adhered to each other as a part of the initial assembly process. If some degree of adhesion is needed during stages of partial fabrication, this can be provided by other means, such as by stapling or by the use of adhesive tapes or papers, or mechanical holders. The interleaving may be accomplished concurrently with the laying up of adjacent wall segments, or after the wall segments have been completely assembled. In such cases, it is usually useful to use a probe or other separator instrument for spreading and alternating the panels in the desired relationship.

The assembled body is then ready for simultaneous pressure treatment and curing. Pressurization by a hydroclave or other suitable mechanism is accomplished from the inside of the structure, so that pressure is exerted radially outwardly toward the female mold, as the temperature is raised for the cure cycle. In this densification and curing step, the resin content of the structure should be sufficient for plastic flow to occur between the adjacent plies. This flow, together with the fact that pressure is exerted outwardly, insures that the entire structure will be substantially free from discontinuities. Finally, the cured unitary structure may be removed from the mold and machined to final dimensions.

It has been found that structures provided in accordance with this method can be assembled more rapidly than the structures provided by tape winding techniques, when the quantity of materials per unit of time alone is considered. More significantly, however, finished composite products are fabricated by the present method far more quickly than by prior techniques.

An important advantage derived from methods in accordance with the invention resides in the uniformity obtained from the densification step. The lack of constraint of individual panels means that there is a minimum tendency of adjacent panels to bind or constrict. In addition, however, the relatively low proportion of volatiles which results from the use of lower resin proportions means that shrinkage is appreciably lower than in tape winding processes. Moreover, since the percentage of volatiles to be eliminated is much less, and since plastic flow occurs between panels, substantially complete freedom from wrinkling is achieved. Such wrinkling, which is extremely difficult to avoid in tape wound structures, would result in an appreciable decrease in actual strength as compared to the theoretical strength of the finished structure.

A different arrangement in accordance with the invention is shown in the composite structure of FIGS. 10–13, in which the ablative structure is again in the form of an expanded hollow cone comprising a solid walled body of revolution 25. This body includes a forward wall segment 26 and a rearward or trailing edge wall segment 27. The first panels 30, which are laid up to comprise the forward wall segment 26, are of silica fiber fabric. The second panels 31, which comprise the rearward wall segment 27, are of glass fiber fabric.

The panels 30 and 31 are interleaved in an intermediate transition zone between the two wall segments 26 and 27. Again, the arc lengths of the panels 30 and 31 form relatively low angles to the circumference of the body 25, and the inner edges of adjacent panels in the two wall segments 26 and 27 are substantially parallel, as are the outer edges.

Figure 14:
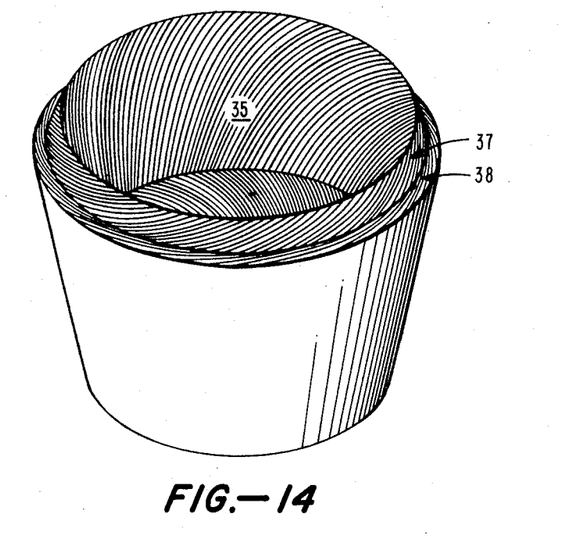
FIG. 14 is a perspective view of yet another form of ablative structure in accordance with the invention.
Figure 15:
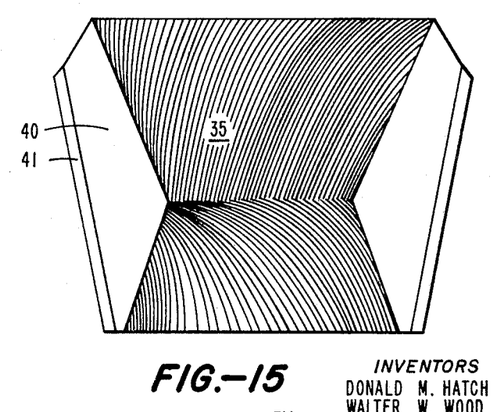
FIG. 15 is a side sectional view of the arrangement of FIG. 14, taken along the lines 15—15 of FIG. 14.
Figure 16:
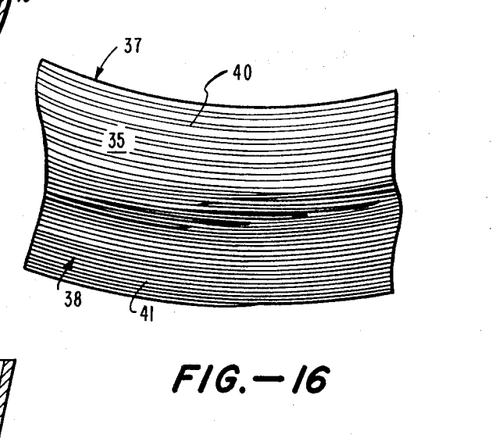
FIG. 16 is an enlarged fragmentary sectional plan view of the arrangement of FIG. 14.

Another configuration in accordance with the invention is shown in FIGS. 14–16, in which the transition zone between different materials is a circumferential zone in a body 35 having a constricted throat portion and formed of an inner wall segment 37 and an outer wall segment 38. The inner wall segment 37 comprises a multiplicity of graphite fabric panels 40, whereas the outer wall segment 38 comprises a multiplicity of glass fiber panels 41. The geometrical shapes and layup angles of the panels in the wall segments 37 and 38 are chosen to provide selected variations in radial thickness of the wall segments throughout the length of the structure. The layup angles of the panels 40 and 41 are substantially alike, such that in the transition zone (referring specifically to FIG. 16) several panels 40 from the inner wall segment 37 may be interleaved within each individual ply 41 from the outer wall segment 38. This interleaving is accomplished with a very slight change in the angle of the panels 40 and 41 and the angle is so small that a relatively long arc length is provided for contact between adjacent plies from the two materials, so that a high interlaminar shear area is presented.

While there have been described above and illustrated in the drawings various forms of structures and methods in accordance with the invention for providing superior forms of ablative structures, it will be appreciated that the invention is not limited thereto. Accordingly, the invention should be considered to include all modifications, alterations and alternative forms falling within the scope of the appended claims.

What is claimed is:

1. The method of forming an ablative structure comprising the steps of impregnating at least two different high-temperature resistant fabric materials with an amount of thermally curable resin just sufficient to permit formation of a solid body during curing, cutting panels from the two materials, laying up the panels of the two materials in at least partially interleaved fashion within a female mold in directions such that adjacent panels are free to flow relative to each other, and curing the resin and densifying the structure thus formed under radially outwardly exerted pressure.

2. The method of forming an ablative structure in the form of a solid walled surface of revolution comprising the steps of laying up panels of dissimilar thermally curable resin impregnated high-temperature resistant materials within a female mold, the panels of dissimilar materials being at least partially interleaved and having like angles relative to the circumference of the mold, the interleaved portions having only minor deviations from the angles of the remainder of the panels to the circumference mold, curing the resin and densifying the structure thus formed within the mold.

3. The method of forming an ablative structure which comprises the steps of succesisvely disposing a number of panels of a first thermally curable resin impregnated high-temperature resistant material in overlapping relation in a given direction to form a first surface, successively disposed a number of panels of a second thermally curable resin impregnated high-temperature resistant material on the first surface in overlapping relation in the given direction, interleaving selected panels of the second material with selected panels of the first material in a transition zone between the two materials curing the resin, and densifying the entire structure thus formed.

4. The method of forming an ablative structure in the form of a solid walled body of revolution comprising the steps of laying up successive panels in circumferentially overlapping relation to define at least two discrete wall segments of different high-temperature resistant materials, the panels being relatively lowly thermally curable resin-impregnated, interleaving panels from adjacent wall segments to form a transition zone of two materials, exerting pressure radially outwardly from the central aperture of the body of revolution and maintaining a cure temperature in the body for a time sufficient to cure the resin while the pressure is being exerted.

5. The invention as set forth in claim 4 above, wherein the panels of the adjacent wall segments which are interleaved are laid up at substantially like angles of arc relative to the body of revolution.

6. The invention as set forth in claim 4 above, wherein the panels comprise resin-impregnated textile materials in geometrical shapes.

7. The method of forming a light weight, high strength solid walled ablative structure having an interior ablative surface in the form of a surface of revolution, the structure having relatively high insulating properties and minimal delamination in operation, including the steps of laying successive individual panels of a first thermally curable resin coated high-temperature resistant fabric in a female mold, the panels each being disposed with an edge along the female mold, and in overlapping relation along a circumferential direction about the mold, laying successive individual panels of a second thremally curable resin coated high-temperature resistant fabric adjacent the first resin coated fabric within the mold, at least some of the panels of the second fabric being interleaved with at least some of the panels of the first fabric, curing the resin and densifying the structure within the mold, and removing the densified structure from the mold.

8. The method of forming a light weight, high strength ablative structure having thick solid walls defining an inner surface of revolution and an outer surface of revolution, the inner surface being non-linear between the open ends of the structure, the structure having relatively high insulating properties and minimal delamination in operation, the method including the steps of laying shaped first panels of a first thermally curable resin coated high strength and high-temperature resistant fabric in a female mold having interior dimensions substantially corresponding to the outer dimensions desired for the structure, the panels each being disposed with an edge along the surface of the female mold, and in successive overlapping relation along a circumferential direction about the mold, the configuration of the panels and the angle of inclination of the individual panels relative to the female mold defining the radial thickness of the outer layer at various points along the longitudinal axis of the structure, laying successive individual second panels of a second thermally curable resin coated ablative fabric interiorly of the first resin coated fabric within the mold, the second panels having a given angle of inclination relative to the female mold as have the first panels, the second panels being interleaved with the first panels over at least a portion of their lengths, laying successive individual third panels of a third thermally curable resin coated high-temperature resistant fabric interiorly of the first resin coated fabric within the mold, the configuration of the third panels and their disposition relative to the first and second panels providing, with the second panels, an interior solid wall, the angle of inclination of the third panels relative to the female mold corresponding to that of the first and second panels relative to the female mold, at least some of the third panels being interleaved with the first and second panels, densifying the structure under temperature and pressure within the mold, such that the resin is fully cured and the structure is compressed within the mold, removing the densified strcture from the female mold, and machining the structure to final dimensions.

9. The method of forming an ablative structure which comprises the steps of successively disposing a number of panels of a first thermally curable resin-impregnated high-temperature resistant material in overlapping relation about the interior of a circular female die to form a first interior surface, successively disposing a number of panels of a second thermally curable resin-impregnated high-temperature resistant material against the first interior surface, the panels of the second material being disposed in overlapping relation circumferentially about the first interior surface, selected panels of the second material being interleaved with panels of the first materail curing the resin, and densifying the entire structure thus formed.

(References on following page)

References Cited

UNITED STATES PATENTS

| | | | |
|---|---|---|---|
| 2,768,920 | 10/1956 | Stout | 138—141 X |
| 3,081,705 | 3/1963 | Warnken | 102—92.5 |
| 3,133,847 | 5/1964 | Millington | 156—69 |
| 3,135,297 | 6/1964 | Nordberg et al. | 138—144 |
| 3,196,001 | 7/1965 | Paulson et al. | 156—296 |

EARL M. BERGERT, *Primary Examiner.*

MARTIN L. KATZ, *Assistant Examiner.*

U.S. Cl. X.R.

29—157; 60—200, 271; 138—141; 239—265.15